United States Patent
Destro et al.

(10) Patent No.: US 9,556,332 B2
(45) Date of Patent: Jan. 31, 2017

(54) POLYOLEFIN COMPOSITION

(71) Applicant: Basell Poliolefine Italia S.r.l., Milan (IT)

(72) Inventors: Mara Destro, Ferrara (IT); Marco Ciarafoni, Ferrara (IT); Paola Massari, Ferrara (IT); Tiziana Caputo, Ferrara (IT)

(73) Assignee: Basell Poliolefine Italia, S.r.l., Milan (IT)

( * ) Notice: Subject to any disclaimer, the term of this patent is extended or adjusted under 35 U.S.C. 154(b) by 0 days.

(21) Appl. No.: 14/651,325

(22) PCT Filed: Nov. 25, 2013

(86) PCT No.: PCT/EP2013/074558
§ 371 (c)(1),
(2) Date: Jun. 11, 2015

(87) PCT Pub. No.: WO2014/090553
PCT Pub. Date: Jun. 19, 2014

(65) Prior Publication Data
US 2015/0307700 A1    Oct. 29, 2015

Related U.S. Application Data

(60) Provisional application No. 61/736,373, filed on Dec. 12, 2012.

(30) Foreign Application Priority Data

Dec. 12, 2012  (EP) .................................... 12196626

(51) Int. Cl.
C08L 23/00    (2006.01)
C08L 23/14    (2006.01)
C08L 23/16    (2006.01)

(52) U.S. Cl.
CPC .............. *C08L 23/142* (2013.01); *C08L 23/16* (2013.01); *C08L 2201/02* (2013.01); *C08L 2205/025* (2013.01)

(58) Field of Classification Search
CPC ....... C08L 23/16; C08L 23/0815; C08L 23/14; C08L 23/18; C08L 2203/02; C08L 2203/10; C08L 2203/16; C08L 2205/02; C08L 2205/025
See application file for complete search history.

(56) References Cited

U.S. PATENT DOCUMENTS 6,342,564 B1    1/2002  Pitkanen et al.

FOREIGN PATENT DOCUMENTS

| EP | 1209187 A1 | 5/2002 |
|----|------------|--------|
| EP | 2020291 A1 | 2/2009 |
| EP | 2143760 A1 | 1/2010 |
| WO | WO-9859002 A1 | 12/1998 |
| WO | WO-0244251 A1 | 6/2002 |
| WO | WO-0244252 A1 | 6/2002 |
| WO | WO-2009016022 A1 | 2/2009 |
| WO | WO-2010003953 A1 | 1/2010 |

OTHER PUBLICATIONS

PCT International Search Report and the Written Opinion—Mailed Dec. 17, 2013 for Corresponding PCT/EP2013/074558.

*Primary Examiner* — Nathan M Nutter

(57) ABSTRACT

A polyolefin composition comprising:
A) from 65 wt % to 85 wt %, of a propylene/ethylene/1-butene terpolymer wherein:
i) the content of ethylene derived units ranges from 0.6 wt % to 2.5 wt;
ii) the content of 1-butene derived units ranges from 6 wt % to 12 wt %;
iii) the fraction soluble in xylene at 25° C. ranges from 3.5 wt % to 20 wt %;
B) from 15 wt % to 35 wt % of a propylene/ethylene copolymer having a content of ethylene derived units ranging from 10 wt % to 40 wt %; the copolymer optionally can contains 1-butene derived units in an amount less than 1 wt %; the sum A)+B) being 100.

8 Claims, No Drawings

POLYOLEFIN COMPOSITION

This application is the U.S. National Phase of PCT International Application PCT/EP2013/074558, filed Nov. 25, 2013, claiming benefit of priority to European Patent Application No. 12196626.1, filed Dec. 12, 2012, and benefit of priority under 35 U.S.C. §119(e) of U.S. Provisional Application No. 61/736,373 filed Dec. 12, 2012, the contents of which are incorporated herein by reference in their entirety.

FIELD OF THE INVENTION

The present invention relates to a polyolefin composition comprising a propylene/ethylene/1-butene terpolymer and a propylene/ethylene copolymer. This composition has good impact resistance especially at low temperature, is soft and shows good optical properties.

BACKGROUND OF THE INVENTION

Traditionally, polymers in which low modulus, as well as good impact at low temperatures are desired properties, have been prepared from soft poly(vinyl chloride) (PVC). However, because PVC products cause environmental problems due to emissions of chlorinated organic compounds during combustion there is currently a trend towards replacing PVC with other polymers. As an alternative to PVC polymers polypropylene polymers have been employed since such polymers are known to have suitable resistance to heat and chemicals as well as attractive mechanical properties.

WO 98/59002 relates to a heterophasic polypropylene copolymer having a tensile modulus of 420 MPa or less comprising:
i) a semi-crystalline propylene: ethylene and optionally other a-olefin copolymer matrix comprising 0.5 to 10 wt % of ethylene and optionally 5 to 12 wt % of the other alpha-olefin; and
ii) an elastomeric propylene-ethylene and optionally other alpha-olefin copolymer The amount of component i) ranges from 20 wt % to 90 wt % preferably from 60 wt % to 90 wt % and the xylene soluble fraction ranges from 3 wt % to 30 wt %.

The applicant found that when component i) is a terpolymer a better balancement of tensile modulus and impact properties can be obtained by fine tuning the above composition. In particular an higher tensile modulus can be obtained in addition at higher izod impact properties while maintaining good values of optical properties.

SUMMARY OF THE INVENTION

An object of the present invention is therefore a polyolefin composition comprising:
A) from 65 wt % to 85 wt %, preferably from 67 wt % to 82 wt %, more preferably from 75 wt % to 81 wt % of a propylene/ethylene/1-butene terpolymer wherein:
i) the content of ethylene derived units ranges from 0.6 wt % to 2.5 wt %; more preferably from 0.8 wt % to 1.9 wt % even more preferably from 0.8 wt % to 1.4 wt %;
ii) the content of 1-butene derived units ranges from 6.0 wt % to 12.0 wt %, preferably from 7.0 wt % to 11.0 wt %; more preferably from 8.0 wt % to 9.5 wt %
iii) the fraction soluble in xylene at 25° C. ranges from 3.5 wt % to 20.0 wt %; preferably from 4.0 wt % to 7.0. wt %; more preferably from 4.3 wt % to wt % 6.0 wt %

B) from 15 wt % to 35 wt %; preferably from 18 wt % to 33 wt %; more preferably from 19 wt % to 25 wt % of a propylene/ethylene copolymer having a content of ethylene derived units ranging from 10.0 wt % to 40.0 wt %; preferably from 15.0 wt % to 30.0 wt %; more preferably from 18.0 wt % to 21.0 wt %; the copolymer optionally can contains 1-butene derived units in an amount less than 1.0 wt %; the sum A)+B) being 100.

DETAILED DESCRIPTION OF THE INVENTION

Preferably the fraction soluble in xylene at 25° C. of the polyolefin composition ranges from 15 wt % to 40 wt %; more preferably from 18 wt % to 35 wt %; even more preferably from 18.5 wt % to 32 wt %. Preferably the intrinsic viscosity of the fraction soluble in xylene at 25° C. of the polyolefin composition ranges from 1 dl/g to 3.5 dl/g; preferably from 1.5 dl/g to 3.0 dl/g; more preferably from 1.6 dl/g to 2.5 dl/g.

The tensile modulus of the polyolefin composition of the present invention before the sterilization is preferably higher than 480 MPa; more preferably the tensile modulus is comprised between 510 MPa and 800 MPa; even more preferably between 550 MPa and 700 MPa.

The haze of the polyolefin composition object of the present invention measured on 1 mm plaque is preferably lower than 30%; more preferably it is comprised between 27% and 10%.

The Izod measured at 23° C. is preferably comprised between 100 KJ/m$^2$ to 50 KJ/m$^2$; more preferably it is comprised between 90 KJ/m$^2$ to 54 KJ/m$^2$.

The Izod measured at 0° C. is preferably comprised between 60 KJ/m$^2$ to 15 KJ/m$^2$; more preferably it is comprised between 55 KJ/m$^2$ to 16 KJ/m$^2$.

The Izod measured at −20° C. is preferably comprised between 10 KJ/m$^2$ to 2 KJ/m$^2$; more preferably it is comprised between 6 KJ/m$^2$ to 2.5 KJ/m$^2$.

The polyolefin composition object of the present invention can be conveniently used for the production of injection molded articles or for films. In particular the polyolefin composition object of the present invention can be conveniently used for medical application, in particular for the preparation of films, bottles and bugs for medical application. This is due to the low hexane extractables that are preferably lower than 20 wt %, more preferably lower than 15 wt % and even more preferably lower than 12 wt % and to the transparency after the sterilization at 121° C. it is well know that polyolefins when treated at 121° C. for 20 minutes that is the normal procedure for sterilization have a loose in terms of haze, i.e. the haze increases considerably. When the polyolefin composition object of the present invention is treated at 121° C. for the sterilization procedure the ratio between the haze measured on cast film 50μ thick before the sterilization and the haze after the sterilization is comprised between 0.20 and 0.60; preferably between 0.35 and 0.55; more preferably between 0.35 and 0.45.

Thus a further object of the present invention are medical articles comprising the polyolefin composition of the present invention. Examples of medical articles are film, bags such as bags for blood, fluid administration bags, ampoules, bottles, ophthalmic ampoules and the like.

The polyolefin composition to be used in the present invention can be prepared by sequential polymerization in at least two stages, with each subsequent polymerization stage being conducted in the presence of the polymeric material formed in the immediately preceding polymerization reaction, wherein the component (A) is normally prepared in at least one first polymerization stage and the component (B) is normally prepared in at least one second polymerization stage.

Each polymerization stage is carried out in presence of a highly stereospecific heterogeneous Ziegler-Natta catalyst. The Ziegler-Natta catalysts suitable for producing the polyolefin composition of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00163261.

Preferably the polymerisation catalyst is a Ziegler-Natta catalyst comprising a solid catalyst component comprising:
a) Mg, Ti and halogen and an electron donor (internal donor),
b) an alkylaluminum compound and, optionally (but preferably),
c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

According to a preferred method, the solid catalyst component can be prepared by reacting a titanium compound of formula $Ti(OR)_{n-y}X_y$ where n is the valence of titanium and y is a number between 1 and n, X is an halogen atom, preferably chlorine, preferably TiC4, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with Tic4 can be carried out one or more times. The internal donor can be added during the treatment with $TiCl_4$ and the treatment with the electron donor compound can be repeated one or more times. Generally, the succinate of formula (I) is used in molar ratio with respect to the MgC12 of from 0.01 to 1 preferably from 0.05 to 0.5. The preparation of catalyst components in spherical form is described for example in European patent application EP-A-395083 and in the International patent application WO98144001. The solid catalyst components obtained according to the above method show a surface area (by B.E.T. method) generally between 20 and 500 m 21 g and preferably between 50 and 400 m 21 g, and a total porosity (by B.E.T. method) higher than 0.2 cm 31 g preferably between 0.2 and 0.6 cm 31 g. The porosity (Hg method) due to pores with radius up to 10.000 A generally ranges from 0.3 to 1.5 cm 31 g, preferably from 0.45 to 1 cm 31 g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkyl-aluminum sesquichlorides such as $AlEt_2Cl$ and $Al_2Et_3Cl_3$.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metildimethoxysilane. The external electron donor compound is used in such an amount to give a molar ratio between the organo-aluminum compound and said electron donor compound of from 0.1 to 500.

The polymerization process can be carried out in gas phase and/or in liquid phase, in continuous or batch reactors, such as fluidized bed or slurry reactors. For example, it is possible to carry out the polymerization of the propylene polymer (A) in liquid phase, using liquid propylene as diluent, while the copolymerization stage to obtain the propylene copolymer fraction (B) is carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

The polyolefin composition used for the containers of the present invention may further comprise additives commonly employed in the polyolefin field, such as antioxidants, light stabilizers, nucleating agents, antiacids, colorants and fillers.

The following examples are given to illustrate the present invention without limiting purpose.

EXAMPLES

Characterization Methods

Melting Temperature and Crystallization Temperature:

Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Melt Flow Rate:

Determined according to the method ISO 1133 (230° C., 2.16 kg).

Solubility in Xylene at 25° C.: Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in thermostatic water bath at 25° C. The so formed solid is filtered on quick filtering paper. 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Polydispersity Index (PI):

Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Ethylene (C2) and 1-butene (C4) content

Ethylene content has been determined by FTIR spectroscopy.

The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band between 750-700 cm-1 after two proper consecutive digital subtractions of an isotactic polypropylene (IPP) spectrum and then of a reference propylene-1-butene random copolymer spectrum, in order to determine ethylene content.

c) Height ($D_{C4}$) of the absorption band at 769 cm-1 (maximum value), after two proper consecutive digital subtractions of an isotactic polypropylene (IPP) spectrum and then of a reference propylene-ethylene random copolymer spectrum, in order to determine 1-butene content.

The ethylene derived units content of component B) has been determined by calculation knowing the total ethylene content and the amount of component B)

Molar Ratio of Feed Gasses

Determined by gas-chromatography

Intrinsic Viscosity

Determined in tetrahydronaphthalene at 135° C.

Samples for the Mechanical Analysis

Samples have been obtained according to ISO 294-2

Flexural Modulus

Determined according to ISO 178

Tensile Modulus

Determined according to ISO 527

Hexane Extratables 10 g of polymer powder has been placed in a 250 ml flask and 100 ml of hexane have been added. The mixture has been refluxed for 4 hours under constant stirring, cooled in iced water and filtered rapidly through a sintered glass filter maintaining the solution at 0° C. (the filtration time is less than 5 minutes).

20 ml of the filtrate is evaporated in a tared glass dish on a water bath and the residue is dried at 100° C. for 1 h.

IZOD Impact Strength

Determined according to ISO 18011A

Haze

Determined according to ASTM D10003-61

5×5 cm specimens are cut molded plaques of 1 mm thick and the haze value is measured using a Gardner photometric unit connected to a Hazemeter type UX-10 or an equivalent instrument having G.E. 1209 light source with filter "C". Reference samples of known haze are used for calibrating the instrument. The plaques to be tested are produced according to the following method. 75×75×1 mm plaques are molded with a GBF Plastiniector G235/90 Injection Molding Machine, 90 tons under the following processing conditions:

| Screw rotation speed | rpm | 120 |
|---|---|---|
| Back pressure | bar | 10 |
| Melt temperature | ° C. | 260 |
| Injection time | sec | 5 |
| Switch to hold pressure | bar | 50 |
| First stage hold pressure | bar | 30 |
| Second stage pressure | bar | 20 |
| Hold pressure profile: $1^{st}$ stage | sec | 5 |
| $2^{nd}$ stage | sec | 10 |
| Cooling time | sec | 20 |
| Mold water temperature | ° C. | 40 |

Cast Film

Films with thickness of 50 μm were prepared by extruding each polymer composition in a single screw Collin extruder (length/diameter ration of screw 1:30) at a film drawing speed of 7 m/min and a melt temperature od 210-250° C.

Sterilization Procedure

The sample is placed in a steam sterilization autoclave Systec DX-65 set at 121 degree Celsius and 2.1 bar of nitrogen internal pressure. After 20 minutes of treatment in the autoclave, the item is let cool down to room temperature and conditioned at room temperature for 48 hours before testing.

Example 1

Catalyst System

The Ziegler-Natta catalyst was prepared according to the Example 5, lines 48-55 of the European Patent EP728769 excepting that $MgCl_2*1.9C_2H_5OH$ has been used instead of $MgCl_2*2.1C_2H_5OH$. Triethylaluminum (TEAL) was used as co-catalyst and dicyclopentyldimethoxysilane (DCPMS) as external donor, with the weight ratios indicated in Table 1.

Prepolymerization Treatment

Before introducing it into the polymerization reactors, the solid catalyst component described above is subjected to prepolymerization by maintaining it in suspension in liquid propylene at 20° C. for about 5 minutes before introducing it into the first polymerization reactor.

Polymerization

The polymerization runs were conducted in continuous in a series of two reactors equipped with devices to transfer the product from one reactor to the one immediately next to it. The first reactor is a polymerisation apparatus as described in EP 1 012 195.

The catalyst is sent to the polymerisation apparatus that comprises two interconnected cylindrical reactors, riser and downcomer. Fast fluidisation conditions are established in the riser by recycling gas from the gas-solid separator. The obtained product is then feed to a fluid bed gas phase reactor. Hydrogen was used as molecular weight regulator.

Component (A) is prepared in the first reactor, while component (B) is prepared in the third.

Hydrogen is used as molecular weight regulator.

The gas phase (propylene, ethylene, 1-butene and hydrogen) is continuously analyzed via gas-chromatography.

At the end of the run the powder is discharged and dried under a nitrogen flow.

The main polymerization conditions are reported in Table 1. The characterization of the obtained composition is reported on table 2.

TABLE 1

| Example | | 1 |
|---|---|---|
| Component A) | | |
| TEAL/external donor | wt/wt | 4 |
| TEAL/catalyst | wt/wt | 5 |
| Temperature | ° C. | 72 |
| Pressure | bar-g | 23 |
| Split holdup riser | wt % | 40 |
| downcomer | wt % | 60 |
| $C_4^-$ riser | mole % | 12 |
| $C_2^-$ riser | mole % | 0.6 |
| $H_2/C_3^-$ riser | mol/mol | 0.013 |
| $C_4^-/(C_4^- + C_3^-)$ | mol/mol | 0.13 |
| MFR | g/10 min | 1.5 |
| XS (xylene solubles) | wt % | 4.6 |
| Component B (gas phase reactor) | | |
| Temperature | ° C. | 75 |
| Pressure | MPa | 1.7 |
| Split | % | 20 |
| $C_2^-/C_2^- + C_3^-$ | mol/mol | 0.23 |
| $H_2/C_2^-$ | mol/mol | 0.27 |

C2 = ethylene;
C3 = propylene;
C4 = 1-butene
H2 = hydrogen

TABLE 2

| Example | | 1 |
|---|---|---|
| Component A | | |
| MFR | g/10' | 1.5 |
| C2 | % | 1.0 |
| C4 | % | 8.4 |
| XS (solubles in xylene) | % | 4.6 |
| Tm | ° C. | 132.0 |
| Component B | | |
| % bipolymer | % | 20 |
| % C2 bipolymer | % | 20.0 |
| Xylene Solubles (XS) | % | 19.0 |
| XS IV | dl/g | 1.74 |
| Total composition | | |
| C2 of the total composition | wt % | 4.3 |
| Melt Flow Rate | g/10' | 2 |
| Flexural Modulus | MPa | 559 |
| Flexural Modulus after ster. | MPa | 586 |
| Tensile Modulus | MPa | 570 |
| Izod Impact 23° C. | kJ/m2 | 57.2 |
| Izod Impact 0° C. | kJ/m2 | 10.9 |
| Izod Impact −20° C. | kJ/m2 | 2.9 |
| D/B TT | ° C. | −15.0 |
| Haze (1 mm plaque) | 5 | 24.8 |
| Haze (1 mm plaque) after ster. | 5 | 43.5 |
| Stress at yield | MPa | 18.5 |
| Elongation at yield | % | 16.3 |
| Stress at break | MPa | 26.3 |
| Elongation at break | % | 470 |
| DSC Tm | ° C. | 132.9 |
| DSC Tc | ° C. | 87 |
| DSC Hm | J/g | 59.4 |
| Cast Film 50 μm | | |
| Haze on 50 m cast film | % | 2.1 |
| Haze on 50 m cast film after ster. | % | 5.6 |
| Hexane extractables Pharmacopoeia | % | 4.8 |

What is claimed is:

1. A polyolefin composition comprising:
    A) from 65 to 85 wt. %, based upon the total weight of the polyolefin composition, of a propylene/ethylene/1-butene terpolymer wherein:
        i) the content of ethylene derived units ranges from 0.6 to 2.5 wt %, based upon the total weight of the terpolymer;
        ii) the content of 1-butene derived units ranges from 6.0 to 12.0 wt %, based upon the total weight of the terpolymer;
        iii) the fraction soluble in xylene at 25° C. ranges from 3.5 to 20.0 wt %, based upon the total weight of the terpolymer;
    B) from 15 to 35 wt % of a propylene/ethylene copolymer, based upon the total weight of the polyolefin composition, having a content of ethylene derived units ranging from 10.0 to 40.0 wt %;
    wherein the combined weight of the terpolymer and the copolymer equals 100 wt %, and wherein the tensile modulus of the polyolefin composition is greater than 480 MPa (ISO 527).

2. The polyolefin composition of claim 1, wherein component A) ranges from 67 to 82 wt %, based upon the total weight of the polyolefin composition, and component B) ranges from 18 to 33 wt %, based upon the total weight of the polyolefin composition.

3. The polyolefin composition of claim 1, wherein in component A) the content of ethylene derived units ranges from 0.8 to 1.9 wt %, based upon the total weight of the terpolymer; and the content of 1-butene derived units ranges from 7.0 wt % to 11.0 wt %, based upon the total weight of the terpolymer.

4. A medical article comprising the polyolefin composition according to claim 1.

5. The medical article according to claim 4, wherein the medical article is a film, bag, bottle or ophthalmic ampoule.

6. The polyolefin composition of claim 1, wherein the haze percentage of the composition as measured on a 1 mm plaque is lower than 30%.

7. The polyolefin composition of claim 1, wherein the ratio between the haze as measured on a 50 μm thick cast film before sterilization at 121° C. and after sterilization at 121° C. is between 0.20 and 0.60.

8. The polyolefin composition of claim 1, wherein the hexane extractable percentage is lower than 20%.

\* \* \* \* \*

UNITED STATES PATENT AND TRADEMARK OFFICE
CERTIFICATE OF CORRECTION

PATENT NO. : 9,556,332 B2
APPLICATION NO. : 14/651325
DATED : January 31, 2017
INVENTOR(S) : Mara Destro et al.

Page 1 of 1

It is certified that error appears in the above-identified patent and that said Letters Patent is hereby corrected as shown below:

In the Specification

| | | |
|---|---|---|
| Column 1 | Line 37 | Delete "a-olefin" and insert --alpha-olefin-- |
| Column 3 | Line 39 | Delete "TiC4," and insert --TiCl$_4$,-- |
| Column 3 | Line 60 | Delete "Tic4" and insert --TiCl$_4$-- |
| Column 3 | Line 65 | Delete "MgC12" and insert --MgCl$_2$-- |
| Column 4 | Line 5 | Delete "m 21 g" and insert --m$^2$/g-- |
| Column 4 | Line 5 | Delete "m 21 g," and insert --m$^2$/g,-- |
| Column 4 | Line 6 | Delete "cm 31 g" and insert --cm$^3$/g-- |
| Column 4 | Line 7 | Delete "cm 31 g." and insert --cm$^3$/g.-- |
| Column 4 | Line 9 | Delete "cm 31 g," and insert --cm$^3$/g,-- |
| Column 4 | Line 9 | Delete "cm 31 g." and insert --cm$^3$/g.-- |
| Column 5 | Line 52 | Delete "(C2)" and insert --(C$_2$)-- |
| Column 5 | Line 52 | Delete "(C4)" and insert --(C$_4$)-- |
| Column 5 | Line 57 | Delete "C2" and insert --C$_2$-- |
| Column 5 | Line 61 | Delete "cm-1" and insert --cm$^{-1}$-- |
| Column 5 | Line 66 | Delete "cm-1" and insert --cm$^{-1}$-- |
| Column 7 | Table 1, Line 21 | Delete "C2" and insert --C$_2$-- |
| Column 7 | Table 1, Line 22 | Delete "C3" and insert --C$_3$-- |
| Column 7 | Table 1, Line 23 | Delete "C4" and insert --C$_4$-- |
| Column 7 | Table 1, Line 24 | Delete "H2" and insert --H$_2$-- |
| Column 8 | Table 2, Line 4 | Delete "C2" and insert --C$_2$-- |
| Column 8 | Table 2, Line 5 | Delete "C4" and insert --C$_4$-- |
| Column 8 | Table 2, Line 10 | Delete "C2" and insert --C$_2$-- |
| Column 8 | Table 2, Line 14 | Delete "C2" and insert --C$_2$-- |
| Column 8 | Table 2, Line 19 | Delete "kJ/m2" and insert --kJ/m$^2$-- |
| Column 8 | Table 2, Line 20 | Delete "kJ/m2" and insert --kJ/m$^2$-- |
| Column 8 | Table 2, Line 21 | Delete "kJ/m2" and insert --kJ/m$^2$-- |

Signed and Sealed this
Seventh Day of January, 2020

Andrei Iancu
*Director of the United States Patent and Trademark Office*